Patented Dec. 28, 1948

2,457,741

UNITED STATES PATENT OFFICE 2,457,741

STABILIZATION OF FATTY MATERIAL

John R. Shipner, South Omaha, Nebr., assignor to The Cudahy Packing Company, Chicago, Ill., a corporation of Maine No Drawing. Application October 15, 1945, Serial No. 622,483

6 Claims. (Cl. 260—398.5)

This invention relates to the stabilization against oxidative deterioration of edible fats and oils, of both animal and vegetable origin, by means of the leaves and stems of the shrub *Larrea divaricata*, the desert plant commonly known as the creosote bush.

It has heretofore been recognized that the phenolic compound nordihydroguaiaretic acid, now usually referred to as NDGA, the chief constituent of various extracts of *Larrea divaricata*, in addition to its recognized antiseptic properties also possesses marked antioxidant properties. It has been reported by Lundberg et al. in Oil and Soap, February 1944, that the leaves and stems of *Larrea divaricata* contain up to about 7% of nor-dihydroguaiaretic acid and that this acid has the property to markedly inhibit the auto-oxidation of certain animal fats. On the other hand NDGA itself has little, if any, effect on vegetable oils.

Various observers have reported that NDGA is unstable to heat and therefore cannot be added with full effect to fats or oils that are subsequently subjected to the heat of deodorizing with any degree of success. Such heat stability is additionally desirable for the reason that, if heat stable, the antioxidant effect persists through baking temperatures and is still effective in the baked products.

In accordance with the present invention, I have found that a glyceride oil or edible fatty material extract of the leaves and stems of *Larrea divaricata*, and which suitably may be an extract made in situ in the deodorization of an edible fatty material such as an animal or vegetable fat or oil, has many advantages over the use of NDGA per se, including great economy of materials, the benefits of the indicated novel process of extraction in situ the glyceride oil material being heat treated, enhanced resistance to heat, and effectiveness with both animal and vegetable fats and oils.

In accordance with the process of in situ extraction of the process of my invention it has been found that when employing powdered leaves and stems of *Larrea divaricata* a total of approximately 18% is oil soluble, indicating that along with the normal 7% content of NDGA, there is extracted about 11% of other oil soluble substances naturally present in the plant. Analysis indicates that this added extracted material is composed mainly of tannic acid and chlorophyll, with smaller amounts of miscellaneous acids.

As indicated by the foregoing, and as more particularly described in my co-pending application Serial No. 622,484, filed October 15, 1945, I have found that tannic acid has a synergistic effect when employed with either NDGA, or in added small amounts with the oil extract of the leaves and stems of *Larrea divaricata* and that the combination gives enhanced and prolonged stability to edible fatty materials.

As an example of the practice of the method of the present invention, an animal fat such as lard, or a vegetable oil such as cotton seed oil, which may or may not have been previously refined and hydrogenated, is placed into a deodorizing vessel together with from about .01% to about .15% by weight of ground leaves and stems of *Larrea divaricata*.

The mass is then heated to a temperature of from about 400° F. to about 500° F. under reduced pressure corresponding to 29¾ inches vacuum as referred to a 30 inch barometer, and blown with steam for about 1½ hours. This is the accepted method of deodorizing fats and oils and serves to distill out free fatty acids and odors, as well as volatile matter from the leaves and stems. The dried and ground leaves and stems have been found to contain about 4% volatile substance other than water.

When the steaming period has been completed the oily material is filtered to remove the undissolved portion of the dried leaves and stems (about 78% of the amount introduced), after which it is ready for chilling and filling into containers in the usual manner.

If only stability is wanted and the presence of fatty acid is unobjectionable, the deodorizing may be done at a temperature as low as about 350° F., for a period of about 3 to 4 hours.

The following comparative table shows the results obtainable in accordance with the present invention in the stabilization of a hydrogenated lard, wherein in all instances the antioxidant was added before deodorizing, deodorizing being thereafter carried out for 1½ hours at a temperature of from 400° to 500° F., in a manner previously described, as compared with an unstabilized lard and lard stabilized with commercial NDGA. The Larrea divaricata was employed in the form of dried and ground leaves and stems. The keeping time in hours was determined according to the method of King, Roschen and Irwin (Oil and Soap—vol. 10, 1933).

Table I

| Test No. | Per Cent by Weight | KQ hours after deodorizing |
|---|---|---|
| 1 | Hydrogenated Lard—Deodorized | 7 |
| 2 | Hydrogenated Lard—Deodorized+.01 NDGA. | 9 |
| 3 | Hydrogenated Lard—Deodorized+.03 Larrea divaricata. | 9½ |
| 4 | Hydrogenated Lard—Deodorized+.05 Larrea divaricata. | 18 |

In the foregoing table, test No. 2, demonstrates what has heretofore been known, namely, that NDGA has the property to increase the keeping quality of lard, as evidenced by the increase in keeping time over the control test No. 1. Test No. 3, in accordance with the present invention, demonstrates that a small proportion of a fatty material extract of the leaves and stems of Larrea divaricata is also effective in increasing the keeping quality of lard. More particularly, it will be noted from this test that although .03% by weight of Larrea divaricata was employed, this was actually equivalent to the employment of only .0021% of NDGA since the dried leaves and stems contain no more than 7% by weight thereof, when not considering the concomitant extracted materials.

Thus test No. 3 demonstrates that the employment of this small percentage of leaves and stems and its relatively much smaller NDGA content as compared to that employed in test No. 2, had a substantially equal or even somewhat better effect in keeping time increase. This I attribute principally to the associated content of tannic and/or other acids contained in the extract of the leaves and stems. The economy arising out of the ability to employ smaller percentages of NDGA, and the economies and advantages of the ability to form the extract containing it, while carrying out the deodorizing operation will also be readily apparent.

Test No. 4 employing .05% by weight of leaves and stems, equivalent to .0035% by weight of NDGA, demonstrates that employment of even such slightly greater but still relatively small amount of material had the effect of an 11 hour increase in keeping time over the control.

Although it has heretofore been considered that NDGA was specific for animal fats and had very little effect on vegetable oils, the following table demonstrates the ability to increase stability of vegetable oils against oxidative deterioration by employing an extract of the dried leaves and stems of Larrea divaricata.

Table II

| Test No. | | Stability in hours Swift Method |
|---|---|---|
| 1 | Hydrogenated Cottonseed Oil—Deodorized | 55 |
| 2 | Hydrogenated Cottonseed Oil—Deodorized plus 0.15% Larrea divaricata. | 75 |

In conducting the foregoing tests the cottonseed oil was subjected to deodorization at a temperature of from about 400° F., to about 450° F., under conditions substantially similar to that previously described with respect to deodorization of hydrogenated lard. In test No. 2 the leaves and stems were incorporated in finely divided form prior to deodorization treatment and thereafter the undissolved material filtered out prior to cooling.

In similar comparative tests, the employment of about .01% NDGA in combination with the cottonseed oil was without appreciable effect in increasing the keeping quality of the cottonseed oil. However, it is apparent from test No. 2 that the incorporation of .15% leaves and stems, equivalent to .01% NDGA, markedly increased the keeping time of the cottonseed oil.

The foregoing tests having been conducted by incorporating the antioxidants and synergists prior to the deodorization heat treatment, produced products which were heat stable, a quality which is highly desirable inasmuch as such materials will retain their potency through the baking of bread or cakes containing them.

As employed in the foregoing specification and particularly the following claims, it will be understood that the term "fatty material" is intended to be inclusive of animal and vegetable fats and oils, whether hydrogenated or not.

I claim as my invention.

1. The process of stabilizing fatty material against oxidative deterioration which comprises incorporating therewith a fatty-material-extract of leaves and stems of Larrea divaricata.

2. The process of stabilizing fatty material against oxidative deterioration which comprises extracting therein leaves and stems of Larrea divaricata.

3. In the processing of fatty material including deodorizing treatment, the step which comprises incorporating therewith prior to deodorization thereof dried leaves and stems of Larrea divaricata, and thereafter removing undissolved solids.

4. The process of treating fatty material to stabilize odor and flavor which comprises mixing with the fatty material powdered leaves and stems of Larrea divaricata, subjecting the mixture to deodorization treatment, and thereafter removing undissolved solids.

5. The process of stabilizing fatty material against oxidative deterioration which comprises incorporating therewith and extracting therein from about .01% to about .15% by weight of dried leaves and stems of Larrea divaricata.

6. The process of stabilizing fatty material against oxidative deterioration which comprises incorporating therewith and extracting therein, at a temperature of from about 350° F., to about 500° F., from about .01% to about .15% by weight of dried leaves and stems of Larrea divaricata.

JOHN R. SHIPNER.

REFERENCES CITED

The following references are of record in the file of this patent:

UNITED STATES PATENTS

| Number | Name | Date |
|---|---|---|
| 2,373,192 | Lauer | Apr. 10, 1945 |

OTHER REFERENCES

Higgins et al.—Oil & Soap, Sept., 1944, pages 277–279.